(12) United States Patent
Shiina et al.

(10) Patent No.: US 8,851,523 B2
(45) Date of Patent: Oct. 7, 2014

(54) VEHICLE FRAME HAVING REAR SUB-PIPE REMOVABLY ATTACHED TO REAR PIPE AND MAIN FRAME

(75) Inventors: Hiromitsu Shiina, Saitama (JP); Akihiro Yamashita, Saitama (JP); Masayuki Hirukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 677 days.

(21) Appl. No.: 13/005,293

(22) Filed: Jan. 12, 2011

(65) Prior Publication Data
US 2011/0175340 A1 Jul. 21, 2011

(30) Foreign Application Priority Data
Jan. 15, 2010 (JP) ................................. 2010-006492

(51) Int. Cl.
*B60K 15/00* (2006.01)
*B62K 5/01* (2013.01)

(52) U.S. Cl.
CPC ........................................ *B62K 5/01* (2013.01)
USPC ............................ 280/834; 280/835; 180/233

(58) Field of Classification Search
USPC .................. 280/785, 834, 835; 180/68.3, 233
See application file for complete search history.

(56) References Cited

U.S. PATENT DOCUMENTS

| 4,461,366 A * | 7/1984 | Honda ........................... 180/229 |
| 4,469,340 A * | 9/1984 | Condet ......................... 280/834 |
| 4,714,126 A * | 12/1987 | Shinozaki et al. ............ 180/233 |
| 4,799,565 A * | 1/1989 | Handa et al. ................. 180/69.4 |
| 6,805,214 B2 * | 10/2004 | Maeda et al. ................ 180/69.4 |
| 6,846,018 B2 * | 1/2005 | Dennert et al. ............... 280/785 |
| 7,284,629 B2 * | 10/2007 | Nakano et al. ............... 180/68.3 |
| 7,770,683 B2 * | 8/2010 | Keogh et al. ................. 180/210 |
| 8,196,989 B2 * | 6/2012 | Yokoyama et al. ............ 296/66 |
| 2006/0065468 A1 * | 3/2006 | Takahashi et al. ............ 180/309 |
| 2008/0283326 A1 | 11/2008 | Bennett et al. |

FOREIGN PATENT DOCUMENTS

| JP | 11-079038 A | 3/1999 |
| JP | 2002-248953 A | 9/2002 |

* cited by examiner

*Primary Examiner* — Kevin Hurley
*Assistant Examiner* — Michael Stabley
(74) *Attorney, Agent, or Firm* — Birch, Stewart, Kolasch & Birch, LLP

(57) ABSTRACT

A frame for a vehicle to accommodate a large-sized accessory, such as a fuel tank, to be mounted downwardly of a rear pipe without having to lower a rear sub-pipe. A large-sized accessory, such as a fuel tank, can be inserted into a space under a rear pipe by removing a second rear sub-pipe from a main frame and the rear pipe. The second rear sub-pipe can be fixed to the main frame and the rear pipe by simply tightening bolts. Similarly, by simply loosening the bolts the second rear sub-pipe can be removed from the main frame and the rear pipe and the large-sized accessory can be removed onto an outside in a vehicle width direction. This facilitates mounting and helps reduce the number of man-hours involved in mounting the accessory.

11 Claims, 8 Drawing Sheets

VEHICLE FRAME HAVING REAR SUB-PIPE REMOVABLY ATTACHED TO REAR PIPE AND MAIN FRAME

CROSS-REFERENCE TO RELATED APPLICATIONS

The present application claims priority under 35 USC 119 to Japanese Patent Application No. 2010-006492 filed on Jan. 15, 2010 the entire contents of which are hereby incorporated by reference.

BACKGROUND OF THE INVENTION

1. Field of the Invention

The present invention relates to a vehicle, and in particular, to a vehicle with improved mountability of large-sized accessories such as a fuel tank.

2. Description of Background Art

An arrangement is known in which a large-sized accessory, such as a fuel tank, is disposed below a rear pipe that supports a seat on which an occupant sits. See, for example, FIGS. 3 and 7 of Japanese Patent Laid-Open No. 2002-248953.

Referring to FIG. 7 Japanese Patent Laid-Open No. 2002-248953, which is a perspective view showing a vehicle body frame, left and right upper portion frame pipes (19) (parenthetic numbers indicate numerals given in Japanese Patent Laid-Open No. 2002-248953; the same holds true hereinafter) extend longitudinally along a vehicle body and have a rear portion supported by an oblique rear portion support pipe (24).

Referring to FIG. 3 Japanese Patent Laid-Open No. 2002-248953, the rear portions of the upper portion frame pipes (19) are referred to as a rear pipe that supports a seat (6). A fuel tank (81) is disposed downwardly of the rear pipe. An oblique member shown downwardly of the fuel tank (81) is the rear portion support pipe (24) shown in FIG. 7.

The fuel tank (81) is disposed in a space between the rear pipe and the rear portion support pipe (24), which achieves efficient space utilization.

The fuel tank (81) is mounted in a direction equivalent to a front-and-back direction of FIG. 3, so that the fuel tank (81) has a height that is smaller than a distance between a lower surface of the rear pipe and an upper surface of the rear portion support pipe (24).

The foregoing structure makes it necessary to lower the rear portion support pipe (24), if there is a need for increasing the size of the fuel tank (81). Because of vehicle structural reasons, however, it is not unlikely that the rear portion support pipe (24) cannot be lowered.

A need therefore exists for a structure that allows a large fuel tank much greater than the distance between the lower surface of the rear pipe and the upper surface of the rear portion support pipe (24) to be mounted without having to lower the rear portion support pipe (24). Though the fuel tank has been used as an example in the foregoing descriptions, any other accessory may be mounted.

SUMMARY AND OBJECTS OF THE INVENTION

It is an object of an embodiment of the present invention to provide a vehicle having a structure that allows a large-sized accessory, such as a fuel tank, to be mounted downwardly of a rear pipe without having to lower a rear portion support pipe.

According to an embodiment of the present invention, a vehicle is provided that includes: at least one main frame extending longitudinally along the vehicle; a pair of left and right rear pipes extending rearwardly of the vehicle from an upper portion of a rear portion of the main frame; left and right rear sub-pipes, each rear sub-pipe connecting between a corresponding rear pipe and the at least one main frame, the rear sub-pipes for reinforcing the rear pipes; and an accessory, such as a fuel tank and an air cleaner, disposed rearwardly of the at least one main frame. In this vehicle, a first rear sub-pipe of the left and right rear sub-pipes is fixed to a first rear pipe of the left and right rear pipes and the at least one main frame; and a second rear sub-pipe is removably attached to a second rear pipe and the at least one main frame.

According to an embodiment of the present invention, the second rear sub-pipe is formed to be removed onto an outside in a vehicle width direction and is fastened with bolts from a side of a vehicle body.

According to an embodiment of the present invention, the first rear sub-pipe has a curved portion that is curved inwardly in the vehicle width direction so as to be disposed at a position closer to a vehicle center side than the first rear pipe in a vehicle plan view; and at least one accessory support portion for supporting the accessory is disposed on such a curved portion.

According to an embodiment of the present invention, the first rear sub-pipe is mounted with a first accessory cover for covering a first side surface of the accessory; the second rear sub-pipe is mounted with a second accessory cover for covering at least two surfaces of a second side surface, a bottom surface, and a rear surface of the accessory; and the first accessory cover is combined with the second accessory cover to thereby cover the accessory.

According to an embodiment of the present invention, the at least one main frame includes a pair of left and right main frames, a cross section extends in the vehicle width direction from a rear portion of the left main frame to a rear portion of the right main frame, and the cross section has a tank support hole, in which a front portion of the fuel tank is supported; and a lug boss extending forwardly of the vehicle from the fuel tank is fitted into the tank support hole.

According to an embodiment of the present invention, an exhaust pipe extending longitudinally along the vehicle or a muffler connected to the exhaust pipe is disposed on an outside in the vehicle width direction of the curved portion.

According to an embodiment of the present invention, a canister for trapping fuel vapor generated in the fuel tank is disposed on the first rear pipe at a position closer to the vehicle center side than the first accessory cover.

According to an embodiment of the present invention, the first rear sub-pipe of the left and right rear sub-pipes (that correspond to the rear portion support pipe of the related art) is fixed to the first rear pipe of the left and right rear pipes (that correspond to the "rear portions" of the upper portion frame pipes of the related art) and the at least one main frame (that corresponds to the upper portion frame pipes of the related art) and the second rear sub-pipe is removably attached to the second rear pipe and the at least one main frame.

A large-sized accessory, such as a fuel tank, can be inserted into a space under the rear pipe by removing the second rear sub-pipe from the main frame and the rear pipe. In addition, the accessory is previously mounted on the second rear sub-pipe and the second rear sub-pipe integrated with the accessory can thereafter be mounted on the main frame and the rear pipe.

More specifically, a first aspect of the present invention provides a vehicle having a structure that allows a large-sized accessory, such as a fuel tank, to be mounted downwardly of the rear pipe without having to lower the rear sub-pipe.

According to an embodiment of the present invention, the second rear sub-pipe is formed to be removed onto the outside in the vehicle width direction and is fastened with bolts from a side of the vehicle body.

The second rear sub-pipe can be fixed to the main frame and the rear pipe by simply tightening the bolts. Similarly, by simply loosening the bolts, the second rear sub-pipe can be removed from the main frame and the rear pipe and the large-sized accessory can be removed onto the outside in the vehicle width direction. This facilitates mounting and helps reduce the number of man-hours involved in mounting the accessory.

According to an embodiment of the present invention, the first rear sub-pipe has the curved portion that is curved inwardly in the vehicle width direction so as to be disposed at a position closer to the vehicle center side than the first rear pipe in a vehicle plan view; and at least one accessory support portion for supporting the accessory is disposed on such a curved portion.

The curved portion of the first rear sub-pipe is curved inwardly in the vehicle width direction so as to be disposed at a position closer to the vehicle center side than the first rear pipe in a vehicle plan view. The first rear sub-pipe can therefore be viewed in a plan view without being obstructed by the first rear pipe disposed upwardly of the first rear sub-pipe. Since the accessory support portion is disposed on the first rear sub-pipe, the bolt can be inserted in the accessory support portion from above and tightened.

According to an embodiment of the present invention, the first rear sub-pipe is mounted with the first accessory cover for covering the first side surface of the accessory; the second rear sub-pipe is mounted with the second accessory cover for covering at least two surfaces of the second side surface, the bottom surface, and the rear surface of the accessory; and the first accessory cover is combined with the second accessory cover to thereby cover the accessory.

The accessory is mounted in advance on the second rear sub-pipe and the second accessory cover is mounted in advance. This allows mounting of the accessory cover to be completed by simply mounting the second rear sub-pipe on the main frame and the rear pipe. More specifically, mounting of the accessory cover is made easy.

According to an embodiment of the present invention, the at least one main frame includes a pair of left and right main frames, the cross section extends in the vehicle width direction from the rear portion of the left main frame to the rear portion of the right main frame, and the cross section has the tank support hole, in which the front portion of the fuel tank is supported; and the lug boss extending forwardly of the vehicle from the fuel tank is fitted into the tank support hole.

The front portion of the fuel tank is fixed to the vehicle body side by simply fitting the lug boss in the tank support hole on the vehicle body side. This reduces the number of man-hours required for mounting the fuel tank.

According to an embodiment of the present invention, the exhaust pipe extending longitudinally along the vehicle or the muffler connected to the exhaust pipe is disposed on the outside in the vehicle width direction of the curved portion.

The exhaust pipe or the muffler is often disposed on the outside in the vehicle width direction of the rear sub-pipe. In such a case, the exhaust pipe or the muffler protrudes outwardly in the vehicle width direction to make the vehicle width greater. In this respect, in the sixth aspect of the present invention, since the exhaust pipe or the muffler is disposed on the outside in the vehicle width direction of the curved portion that is curved inwardly in the vehicle width direction, the vehicle width can be inhibited from being increased.

According to an embodiment of the present invention, the canister for trapping fuel vapor generated in the fuel tank is disposed on the first rear pipe at a position closer to the vehicle center side than the first accessory cover.

Since the canister is disposed on the first rear pipe, there is no likelihood that the canister will be removed when the accessory is removed together with the second rear sub-pipe. Moreover, the canister is covered with the first accessory cover. This makes it difficult to remove the canister and there is no likelihood that the canister will be inadvertently removed.

In addition, if the exhaust pipe or the muffler is disposed downwardly of the first rear pipe, it results in the canister being disposed near the exhaust pipe or the muffler, so that the canister is expected to be heated by heat of the exhaust pipe or the muffler and purging efficiency of the canister be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
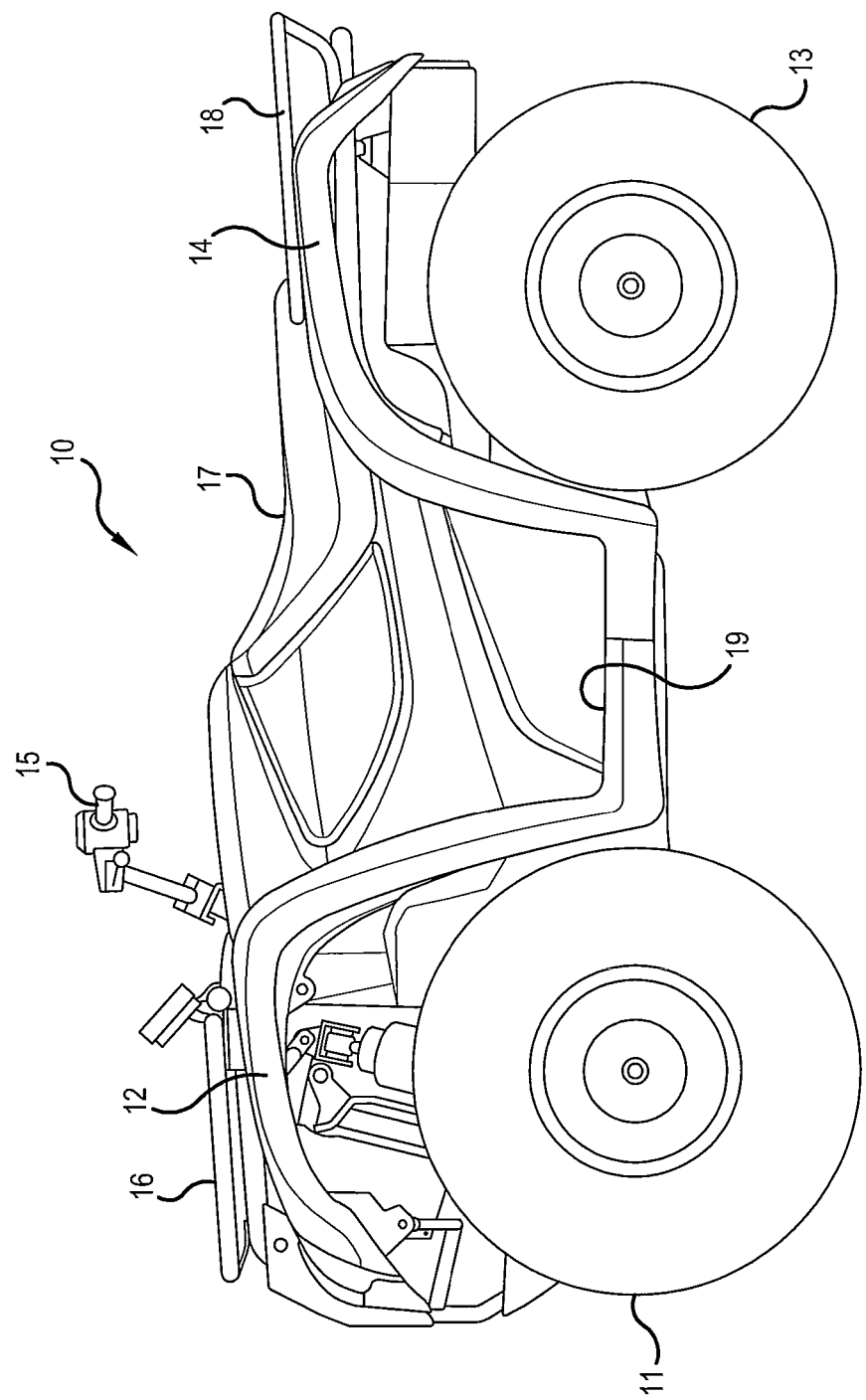
FIG. 1 is a side elevational view showing a vehicle according to an embodiment of the present invention.

A specific embodiment to which the present invention is applied will be described below with reference to the accompanying drawings. The drawings should be viewed in the direction of reference numerals.

An embodiment of the present invention will be described below with reference to the accompanying drawings.

Referring to FIG. 1, a vehicle 10 is a small-sized vehicle that includes a front wheel 11, a front fender 12, a rear wheel 13, a rear fender 14, a steering handlebar 15, a front luggage deck 16, a seat 17, and a rear luggage deck 18. More specifically, the front wheel 11 is disposed at a lower portion of a front portion of a vehicle body. The front fender 12 is disposed upwardly of the front wheel 11. The rear wheel 13 is disposed at a lower portion of a rear portion of the vehicle body. The rear fender 14 is disposed upwardly of the rear wheel 13. The steering handlebar 15 is disposed upwardly of the front wheel 11. The front luggage deck 16 is disposed at the front of the steering handlebar 15. The seat 17 and the rear luggage deck 18 are disposed rearwardly of the steering handlebar 15.

Figure 2:
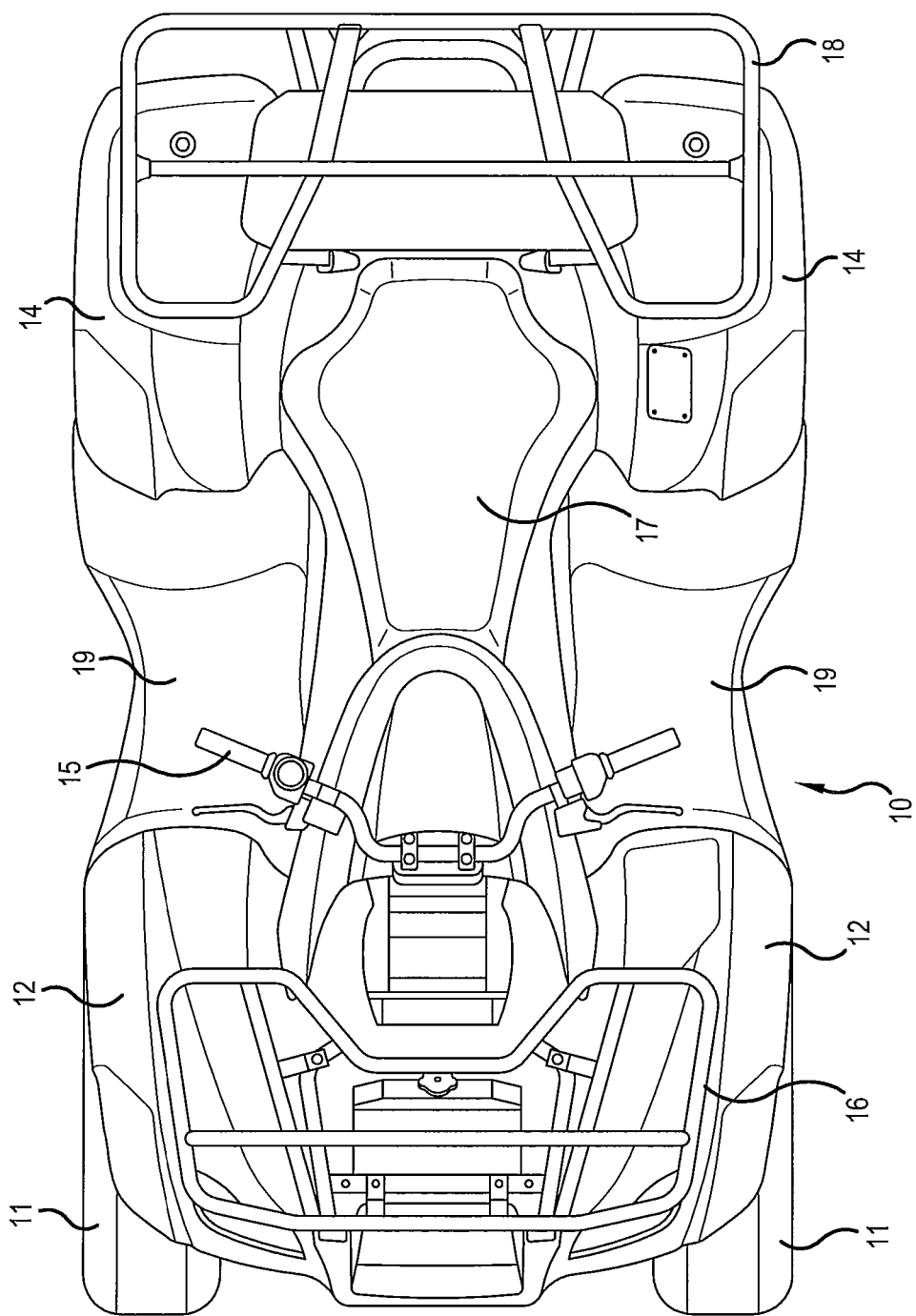
FIG. 2 is a plan view showing the vehicle according to the embodiment of the present invention.

Referring to FIG. 2, the vehicle 10 is a saddle riding type, off-road vehicle having left and right step floors 19, 19 between the steering handlebar 15 and the seat 17. An occupant sitting on the seat 17 can rest his or her feet on the step floors 19, 19.

A structure of a vehicle body frame that forms a main element of the vehicle 10 described above will be described below.

Figure 3:
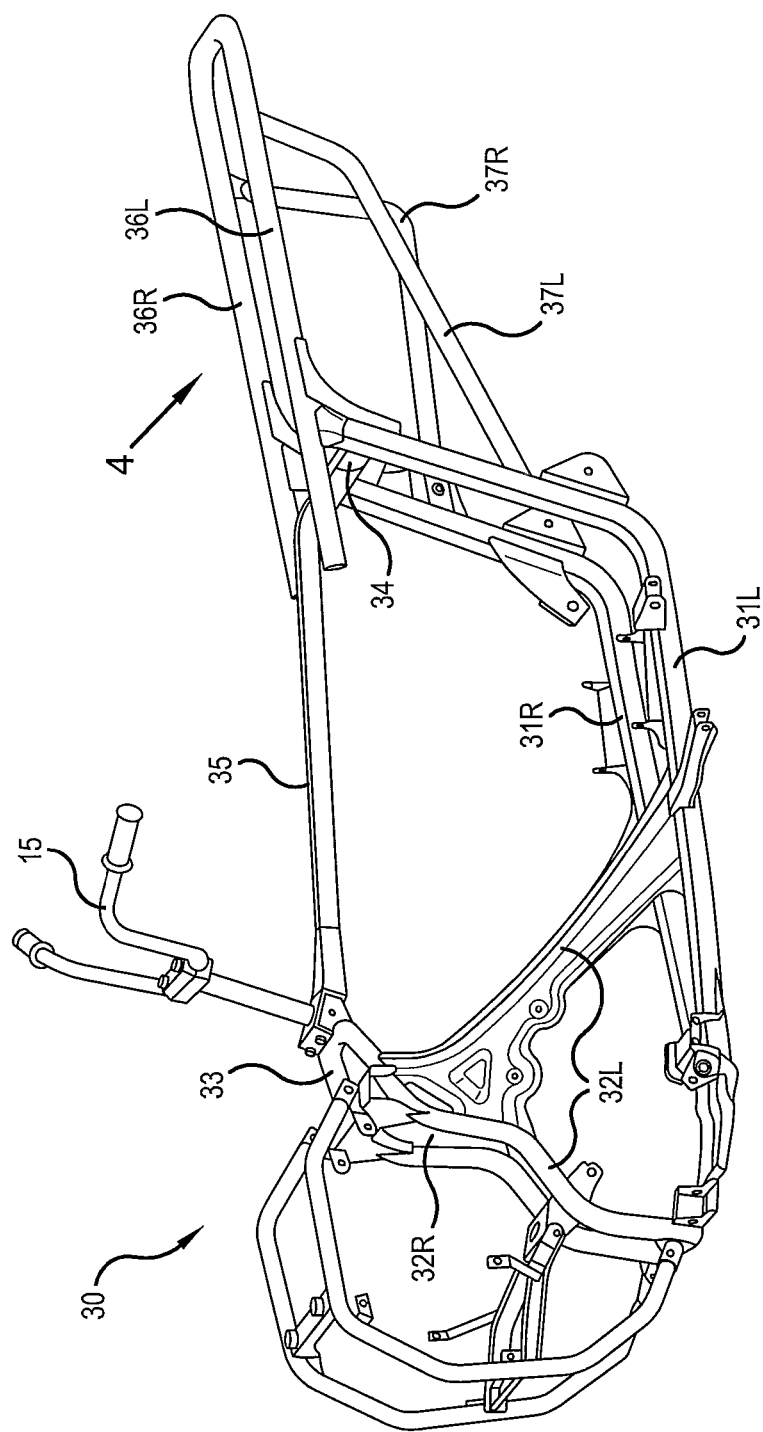
FIG. 3 is a perspective view showing a vehicle body frame.

Referring to FIG. 3, a vehicle body frame 30 includes a pair of left and right main frames 31L, 31R (L is a suffix indicating the left as viewed from the occupant and R is a suffix indicating the right as viewed from the occupant; the same holds true hereinafter), left and right front wheel suspension support sections 32L, 32R, a first cross section 33, a second cross section 34, an upper tension pipe 35, a pair of left and right rear pipes 36L, 36R, a first rear sub-pipe 37L, and a second rear sub-pipe 37R. More specifically, the main frames 31L, 31R extend in a vehicle longitudinal direction and has rear portions curved upwardly. The front wheel suspension support sections 32L, 32R are formed of pipes or frames that extend upwardly from front portions of the main frames 31L, 31R to support a front wheel suspension system. The first cross section 33 extends in a vehicle width direction from the left front wheel suspension support section 32L to the right front wheel suspension support section 32R. The second cross section 34 extends in the vehicle width direction from the rear portion of the left main frame 31L to the rear portion of the right main frame 31R. The upper tension pipe 35 has a front end removably attached to the first cross section 33 and a rear end removably attached to the second cross section 34. The rear pipes 36L, 36R extend rearwardly of the vehicle from upper portions of the rear portions of the main frames 31L, 31R. The first rear sub-pipe 37L extends obliquely to the first rear pipe 36L from an intermediate portion of the rear portion of the first main frame 31L. The second rear sub-pipe 37R extends obliquely to the second rear pipe 36R from an intermediate portion of the rear portion of the second main frame 31R. The rear sub-pipes 37L, 37R are reinforcing stays for reinforcing the rear pipes 36L, 36R.

The reinforcing stays will be described in more detail.

The first rear sub-pipe 37L is welded to the first main frame 31L and the first rear pipe 36L.

Figure 4:
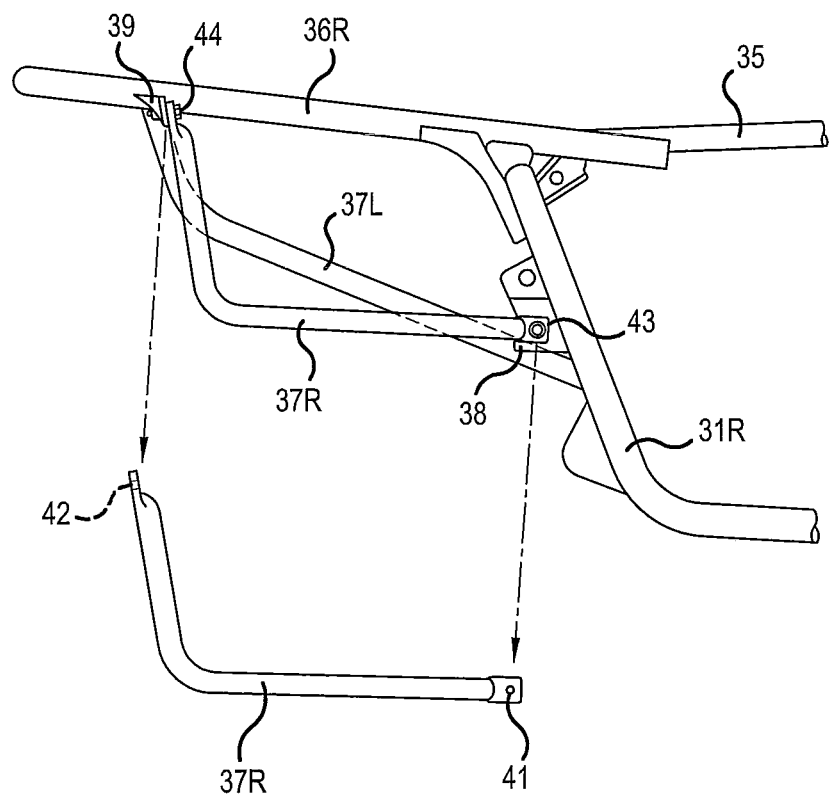
FIG. 4 is a view on arrow 4 of FIG. 3.

The second rear sub-pipe 37R is removably fastened to the second main frame 31R and the second rear pipe 36R as shown in FIG. 4 that is a view on arrow 4 of FIG. 3.

For example, a front portion stay 38 extends rearwardly of the vehicle from the intermediate portion of the rear portion of the second main frame 31R. The front portion stay 38 has a surface that can be viewed from a side of the vehicle.

A rear portion stay 39 extends downwardly from the rear portion of the second rear pipe 36R. The rear portion stay 39 has a surface that can be viewed from a forward direction of the vehicle.

The second rear sub-pipe 37R having an L-shape is a pipe member that has a bolt hole 41 penetrating in the vehicle width direction at a front end portion thereof and a bolt hole 42 penetrating in the vehicle longitudinal direction at a rear end portion thereof.

Bolts 43, 44 are passed through the bolt holes 41, 42, respectively, to thereby removably attach the second rear sub-pipe 37R to the second main frame 31R and the second rear pipe 36R.

When the front end of the rear sub-pipe 37R is applied to the surface of the front portion stay 38, and when an external force then acts on the rear sub-pipe 37R in the vehicle width direction, the external force is effectively removably supported by the surface of the front portion stay 38.

Similarly, when the rear end of the rear sub-pipe 37R is applied to a front surface of the rear portion stay 39, and when an external force then acts on the rear sub-pipe 37R rearwardly of the vehicle, the external force is effectively removably supported by the front surface of the rear portion stay 39.

Shapes of the rear sub-pipes 37L, 37R will be additionally described with reference to FIG. 5.

Figure 5:
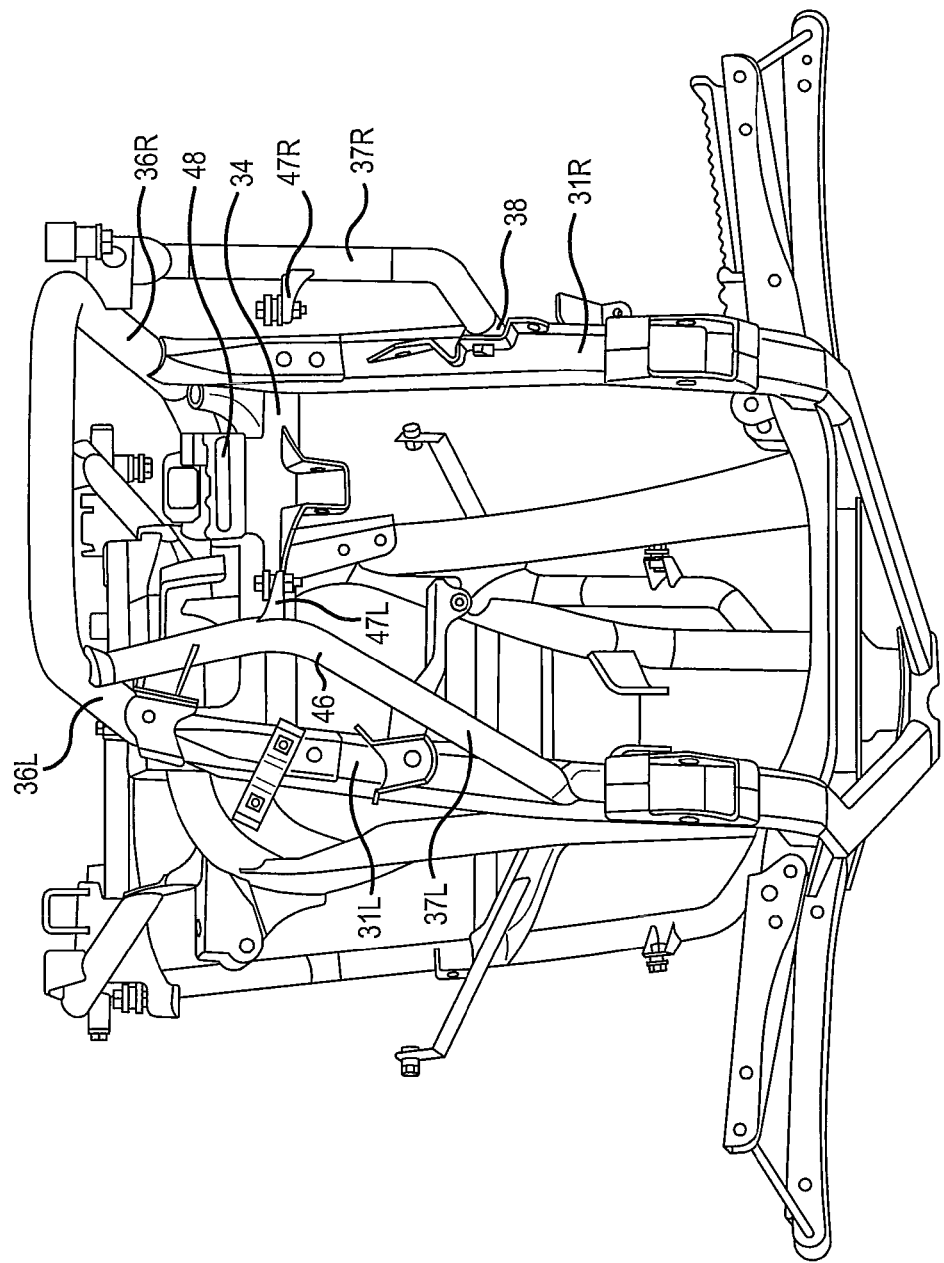
FIG. 5 is a backside perspective view showing the vehicle body frame.

Referring to FIG. 5, the right rear sub-pipe 37R has a descent portion extending downwardly substantially in parallel with the main frame 31R.

The left rear sub-pipe 37L, on the other hand, is curved so as to bulge inwardly in the vehicle width direction (toward a vehicle width center side), which forms a curved portion 46. At least one left accessory support portion 47L is disposed on the curved portion 46 so as to bulge inwardly in the vehicle width direction.

A right accessory support portion 47R that assumes a counterpart of the left accessory support portion 47L is disposed on the right rear sub-pipe 37R.

The cross section (second cross section 34) that extends from the rear portion of the left main frame 31L to the rear portion of the right main frame 31R has a tank support hole 48. The tank support hole 48 opens rearwardly of the vehicle.

The accessories will be described below.

The embodiment of the present invention will be described by using a fuel tank as an example. The type of accessories may nonetheless be any large-sized onboard part, such as an air cleaner, or a battery or other electrical part.

Figure 6:
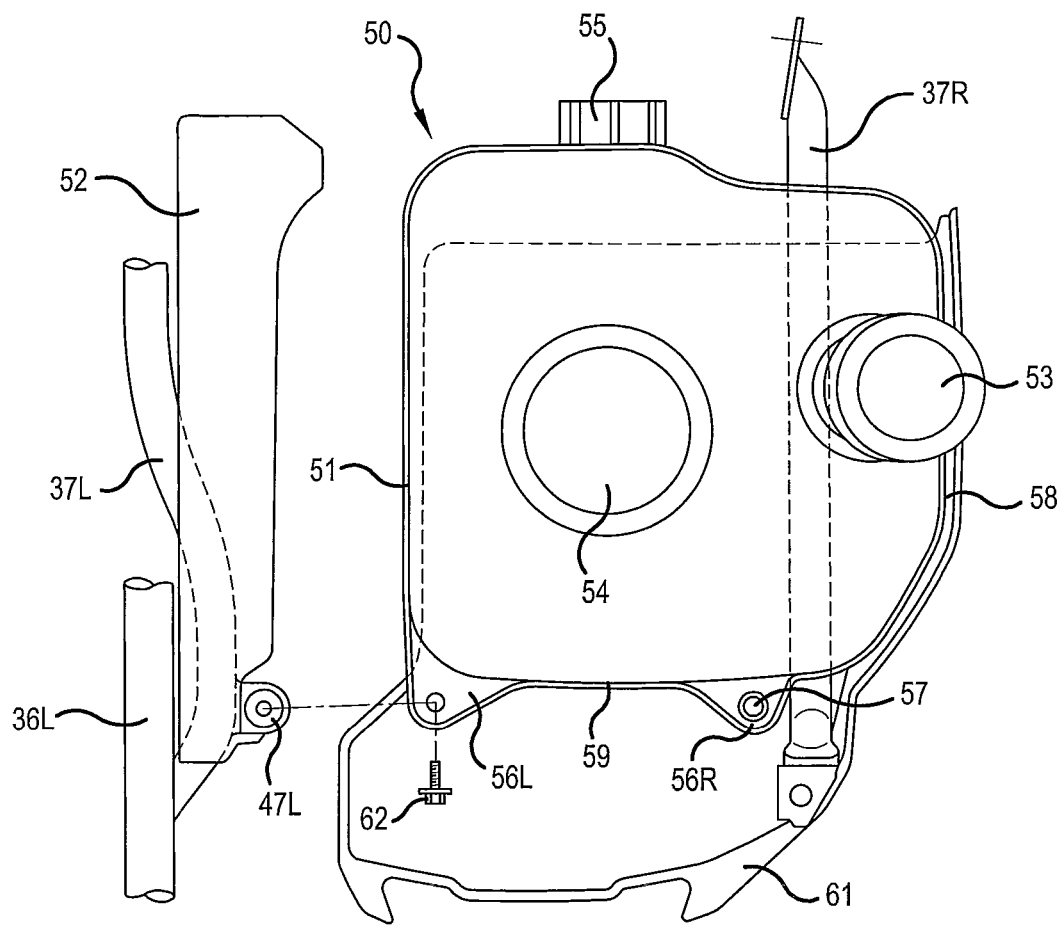
FIG. 6 is an exploded view showing an accessory cover.

Referring to FIG. 6, a first accessory cover 52 that covers a left side surface 51 of a fuel tank 50 is mounted on the first rear sub-pipe 37L.

In addition, the fuel tank 50 is a container that has a substantially rectangular shape in a plan view and includes a fuel cap 53 and a fuel pump 54. The fuel tank 50 further includes a lug boss 55 disposed at a front surface thereof, extending forwardly of the vehicle, and a right flange 56R and a left flange 56L disposed on a rear surface thereof.

The fuel tank 50 having arrangements as described above is attached to the second rear sub-pipe 37R in advance by fastening the right flange 56R and the right accessory support portion (identified by reference numeral 47R in FIG. 5) with a bolt 57.

At the same time, a second accessory cover 61 that covers a right side surface 58, a bottom surface, and a rear surface 59 of the fuel tank 50 is attached to the second rear sub-pipe 37R in advance.

Figure 7:
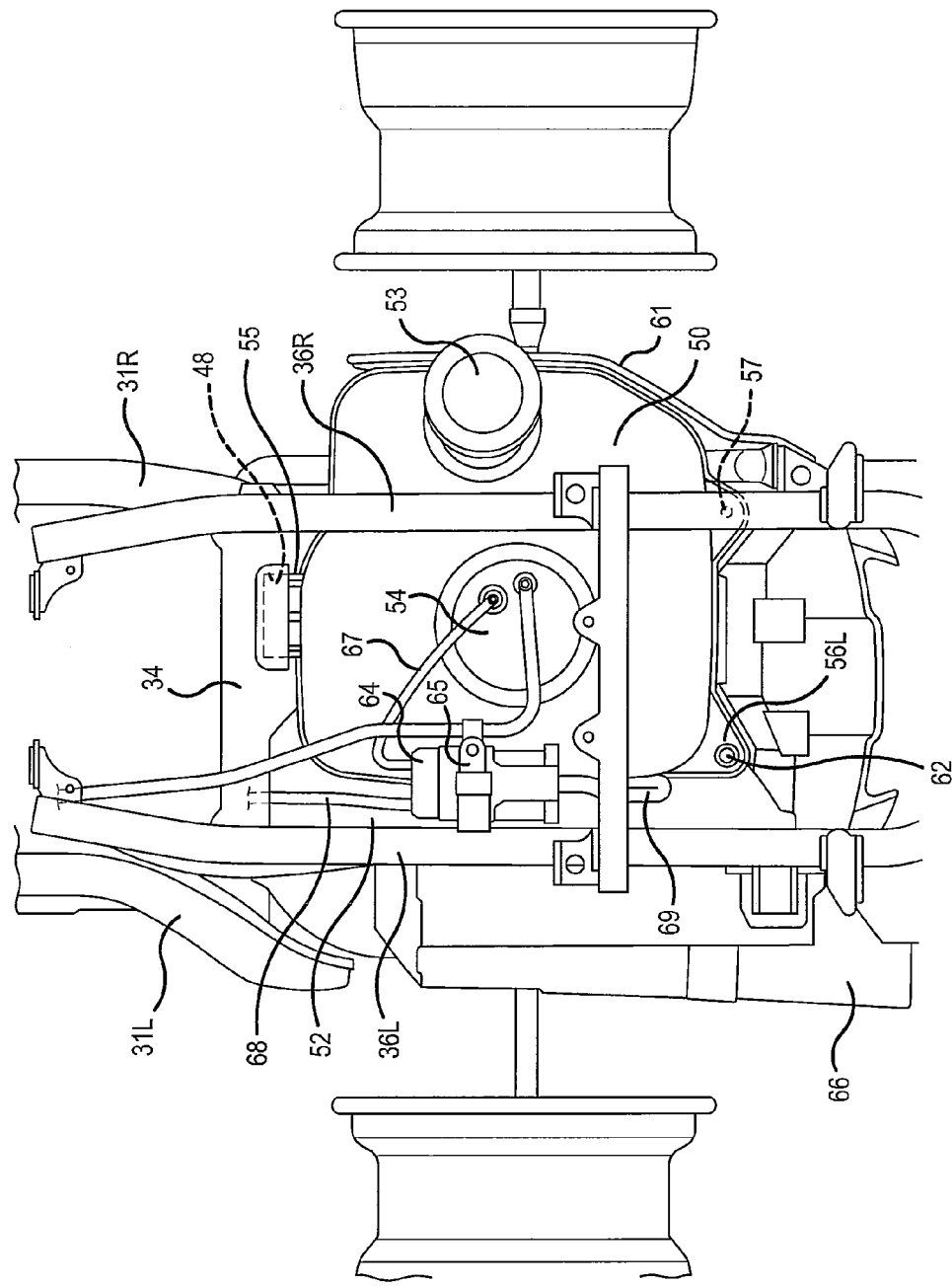
FIG. 7 is an assembly drawing of the accessory cover.

Referring to FIG. 7, while the lug boss 55 on the side of the fuel tank 50 is being inserted in the tank support hole 48 on the vehicle body side, the left flange 56L is placed on the left accessory support portion (identified by reference numeral 47L in FIG. 5), and a bolt 62 is inserted from above and tightened. The fuel tank 50 is now fixed to the vehicle body side at one place at the front and two places in the rear, a total of three places.

As a result, the first accessory cover 52 is combined with the second accessory cover 61 to be a single complete accessory cover. The complete accessory cover covers the bottom surface, the rear surface 59, the left side surface, and the right side surface 58 of the fuel tank 50.

In addition, a canister 64 that traps fuel vapor generated in the fuel tank 50 is mounted on the first rear pipe 36L by a stay 65 at a position closer to the vehicle center side than the first accessory cover 52. The fuel vapor generated in the fuel tank 50 is collected in the canister 64 through a charge pipe 67 that extends from the fuel tank 50 and connects to a front portion of the canister 64. The fuel vapor is then sent as appropriately to an intake system of an engine through a purge pipe 68 that extends forwardly of the vehicle from the front portion of the canister 64. Additionally, a drain pipe 69 extends from a rear surface of the canister 64 to be open to atmosphere.

In addition, a fuel supply pipe 71 is routed from the fuel pump 54 along the right side of the canister 64 in the vehicle width direction and the right side of the left rear pipe 36L in the vehicle width direction toward the engine.

Figure 8:
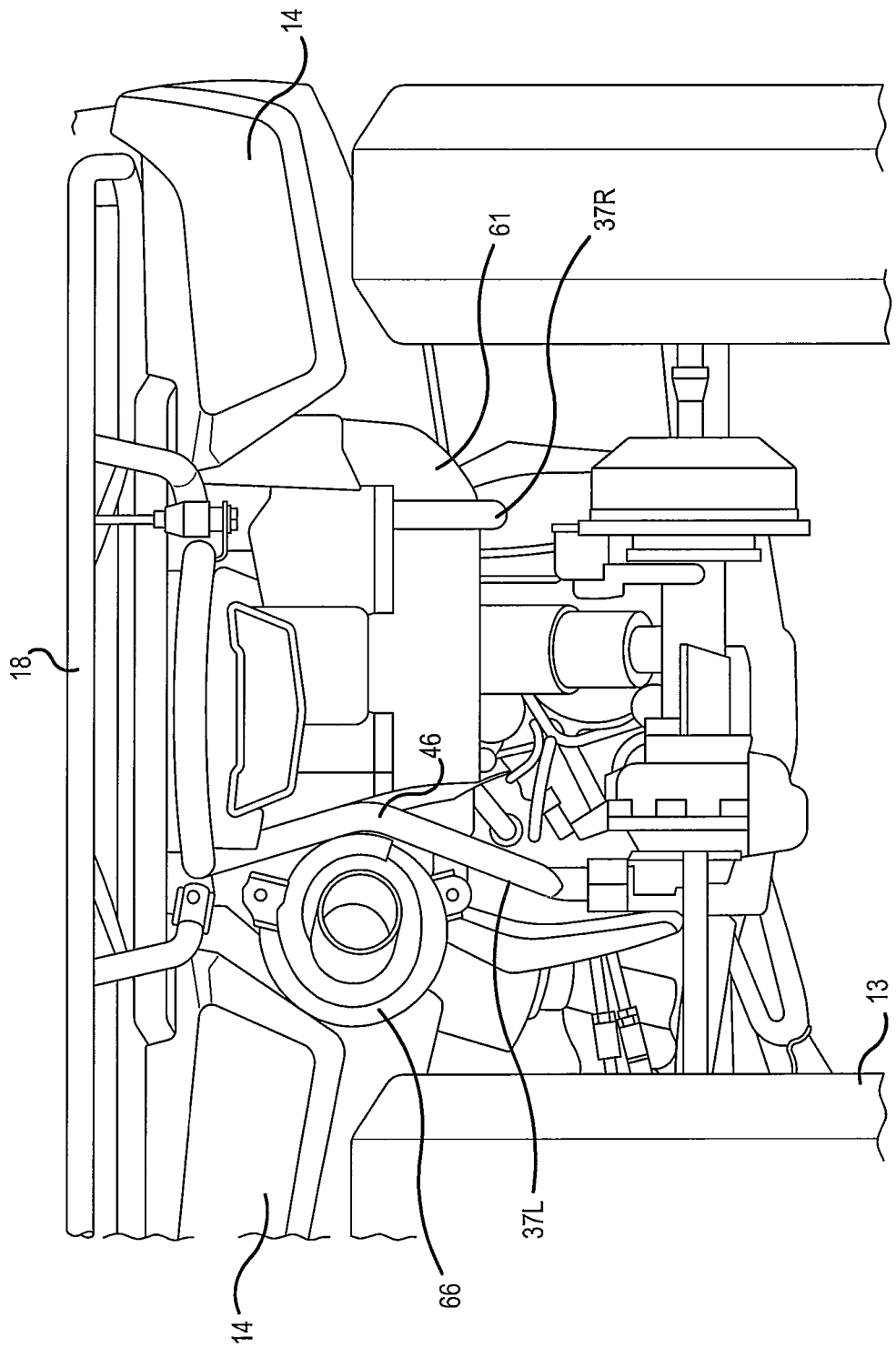
FIG. 8 is a rear elevational view showing the vehicle according to the embodiment of the present invention.

Referring to FIG. 8, an exhaust pipe extending in the vehicle longitudinal direction or a muffler 66 connected thereto is disposed on the outside in the vehicle width direction of the curved portion 46.

Effects of the rear portion structure of the vehicle 10 having arrangements as described heretofore will be described below.

Referring to FIG. 4, a large-sized accessory, such as the fuel tank, can be inserted into a space under the right rear pipe 36R by removing the second rear sub-pipe 37R from the right main frame 31R and the right rear pipe 36R.

Further, the arrangements permit the following. More specifically, the accessory 50 previously mounted on the second rear sub-pipe 37R as shown in FIG. 6 and the second rear sub-pipe 37R integrated with the accessory 50 can thereafter be mounted on the right main frame 31R and the right rear pipe 36R shown in FIG. 4.

Referring to FIG. 4, the second rear sub-pipe 37R is adapted to be removed onto the outside in the vehicle width direction and fastened with the bolts 43, 44 from a side of the vehicle body.

The second rear sub-pipe 37R can be fixed to the right main frame 31R and the right rear pipe 36R by simply tightening the bolts 43, 44. Similarly, by simply loosening the bolts 43, 44, the second rear sub-pipe 37R can be removed from the right main frame 31R and the right rear pipe 36R and the large-sized accessory can be removed onto the outside in the vehicle width direction. This facilitates mounting and helps reduce the number of man-hours involved in mounting the accessory.

Referring to FIG. 5, the first rear sub-pipe 37L includes the curved portion 46 that is curved inwardly in the vehicle width direction so as to be disposed at a position closer to the vehicle center side than the first rear pipe 36L in a vehicle plan view. At least one left accessory support portion 47L for supporting the accessory is disposed on this curved portion 46.

The curved portion 46 of the first rear sub-pipe 37L is curved inwardly in the vehicle width direction so as to be disposed at a position closer to the vehicle center side than the first rear pipe 36L in a vehicle plan view. As shown in FIG. 6, therefore, the first rear sub-pipe 37L can be viewed in a plan view without being obstructed by the first rear pipe 36L disposed upwardly of the first rear sub-pipe 37L. Since the left accessory support portion 47L is disposed on the first rear sub-pipe 37L, the bolt 62 can be inserted in the left accessory support portion 47L from above and tightened as shown in FIG. 7.

Further, referring to FIG. 4, the first accessory cover 52 that covers a first side surface of the accessory 50 is disposed on the first rear sub-pipe 37L, and the second accessory cover 61 that covers at least two surfaces of a second side surface, the bottom surface, and the rear surface of the accessory 50 is disposed on the second rear sub-pipe 37R. The first accessory cover 52 is then combined with the second accessory cover 61 to cover the accessory 50.

The accessory 50 is mounted in advance on the second rear sub-pipe 37R and the second accessory cover 61 is mounted in advance. This allows mounting of the accessory cover to be completed by simply mounting the second rear sub-pipe 37R on the main frame and the rear pipe. More specifically, mounting of the accessory cover is made easy.

Referring to FIG. 7, the second cross section 34 that extends in the vehicle width direction from the rear portion of the left main frame 31L to the rear portion of the right main frame 31R has the tank support hole 48, in which the front portion of the fuel tank 50 is supported. It is further arranged that the lug boss 55 that extends forwardly of the vehicle from the fuel tank 50 is fitted in the tank support hole 48.

The front portion of the fuel tank 50 is fixed to the vehicle body side by simply fitting the lug boss 55 in the tank support hole 48 on the vehicle body side. This reduces the number of man-hours required for mounting the fuel tank 50.

As illustrated in FIG. 8, the exhaust pipe extending in the vehicle longitudinal direction or the muffler 66 connected thereto is disposed on the outside in the vehicle width direction of the curved portion 46.

Since the exhaust pipe or the muffler 66 is disposed on the outside in the vehicle width direction of the curved portion 46 that is curved inwardly in the vehicle width direction, the vehicle width can be inhibited from being increased.

As illustrated in FIG. 7, the canister 64 is mounted on the first rear pipe 36L at a position closer to the vehicle center side than the first accessory cover 52.

Since the canister 64 is disposed on the first rear pipe 36L, there is no likelihood that the canister 64 will be removed when the accessory 50 is removed together with the second rear sub-pipe 37R.

Moreover, the canister 64 is covered with the first accessory cover 52. This makes it difficult to remove the canister 64 and there is no likelihood that the canister 64 will be inadvertently removed.

The canister 64 will be heated by heat of the exhaust pipe or the muffler 66. Thus, the purging efficiency of the canister 64 will be enhanced.

In the embodiment of the present invention, the word "first" is used to denote the left element and the word "second" is used to denote the right element. Nonetheless, the "first" may be used to denote the right element and the "second" used to denote the left element.

In addition, the three surfaces (the bottom surface, the rear surface, and the right side surface) of the fuel tank as the accessory are covered with the second accessory cover. However, the rear surface may be omitted as long as the vehicle body cover can cover the same. Consequently, the second accessory cover should serve its purpose as long as it can cover at least two surfaces of the accessory.

The vehicular rear portion structure according to the present invention is suitable for a small-sized vehicle, in particular, an off-road vehicle. The structure may still be applied to other types of vehicles.

The vehicular rear portion structure according to the present invention is suitable for an off-road vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
   at least one main frame extending longitudinally along the vehicle;

a pair of left and right rear pipes extending rearwardly of the vehicle from an upper portion of a rear portion of the main frame;

left and right rear sub-pipes, each rear sub-pipe connecting between a corresponding rear pipe and the at least one main frame, the rear sub-pipes for reinforcing the rear pipes; and an accessory disposed rearwardly of the at least one main frame;

wherein:

a first rear sub-pipe of the left and right rear sub-pipes is fixed to a first rear pipe of the left and right rear pipes and the at least one main frame;

a second rear sub-pipe is removably attached to a second rear pipe and the at least one main frame;

the first rear sub-pipe has a curved portion that is curved inwardly in a vehicle width direction so as to be disposed at a position closer to a vehicle center side than the first rear pipe in a vehicle plan view;

at least one accessory support portion for supporting the accessory is disposed on the curved portion;

the first rear sub-pipe is mounted with a first accessory cover for covering a first side surface of the accessory;

the second rear sub-pipe is mounted with a second accessory cover for covering at least two surfaces of a second side surface, a bottom surface, and a rear surface of the accessory; and the first accessory cover is combined with the second accessory cover to thereby cover the accessory.

2. The vehicle according to claim 1, wherein the second rear sub-pipe is formed to be removed onto an outside in a vehicle width direction and is fastened with bolts from a side of a vehicle body.

3. The vehicle according to claim 2, wherein:

the accessory is a fuel tank;

the at least one main frame comprises a pair of left and right main frames with a cross section extending in the vehicle width direction from a rear portion of the left main frame to a rear portion of the right main frame, and the cross section has a tank support hole, in which a front portion of the fuel tank is supported; and a lug boss extending forwardly of the vehicle from the fuel tank is fitted into the tank support hole.

4. The vehicle according to claim 2, wherein the accessory is a fuel tank, and a canister for trapping fuel vapor generated in the fuel tank is disposed on the first rear pipe at a position closer to the vehicle center side than the first accessory cover.

5. The vehicle according to claim 1, wherein:

the accessory is a fuel tank;

the at least one main frame comprises a pair of left and right main frames with a cross section extending in the vehicle width direction from a rear portion of the left main frame to a rear portion of the right main frame, and the cross section has a tank support hole, in which a front portion of the fuel tank is supported; and a lug boss extending forwardly of the vehicle from the fuel tank is fitted into the tank support hole.

6. The vehicle according to claim 5, wherein an exhaust pipe extending longitudinally along the vehicle or a muffler connected to the exhaust pipe is disposed on an outside in the vehicle width direction of the curved portion of the first rear sub-pipe.

7. The vehicle according to claim 1, wherein an exhaust pipe extending longitudinally along the vehicle or a muffler connected to the exhaust pipe is disposed on an outside in the vehicle width direction of the curved portion of the first rear sub-pipe.

8. The vehicle according to claim 1, wherein the accessory is a fuel tank, and a canister for trapping fuel vapor generated in the fuel tank is disposed on the first rear pipe at a position closer to the vehicle center side than a first accessory cover that covers a first side surface of the accessory.

9. A vehicle comprising:

at least one main frame extending longitudinally along the vehicle;

a pair of left and right rear pipes extending rearwardly of the vehicle from an upper portion of a rear portion of the main frame;

left and right rear sub-pipes, each rear sub-pipe connecting between a corresponding rear pipe and the at least one main frame, the rear sub-pipes for reinforcing the rear pipes; and an accessory disposed rearwardly of the at least one main frame;

wherein:

a first rear sub-pipe of the left and right rear sub-pipes is fixed to a first rear pipe of the left and right rear pipes and the at least one main frame;

a second rear sub-pipe is removably attached to a second rear pipe and the at least one main frame;

the first rear sub-pipe has a curved portion that is curved inwardly in a vehicle width direction so as to be disposed at a position closer to a vehicle center side than the first rear pipe in a vehicle plan view;

at least one accessory support portion for supporting the accessory is disposed on the curved portion; and the accessory is a fuel tank, and a canister for trapping fuel vapor generated in the fuel tank is disposed on the first rear pipe at a position closer to the vehicle center side than a first accessory cover that covers a first side surface of the accessory.

10. A frame for a vehicle comprising:

at least one main frame extending longitudinally;

a pair of left and right rear pipes extending rearwardly from an upper portion of a rear portion of the main frame;

left and right rear sub-pipes, each rear sub-pipe connecting between a corresponding rear pipe and the at least one main frame, the rear sub-pipes for reinforcing the rear pipes; and at least one of a fuel tank and an air cleaner disposed rearwardly of the at least one main frame;

wherein:

a first rear sub-pipe of the left and right rear sub-pipes is fixed to a first rear pipe of the left and right rear pipes and the at least one main frame;

a second rear sub-pipe is removably attached to a second rear pipe and the at least one main frame;

the first rear sub-pipe has a curved portion that is curved inwardly in a frame width direction so as to be disposed at a position closer to a frame center side than the first rear pipe in a vehicle plan view; and at least one accessory support portion for supporting the at least one of a fuel tank and an air cleaner as an accessory is disposed on the curved portion.

11. The frame for a vehicle according to claim 10, wherein the second rear sub-pipe is formed to be removed outside in a width direction of the frame and is fastened with bolts from a side of a vehicle body.

* * * * *